US008621840B2

(12) United States Patent
Ferrera et al.

(10) Patent No.: US 8,621,840 B2
(45) Date of Patent: Jan. 7, 2014

(54) CONTROL DEVICE AND METHOD OF A GAS TURBINE ELECTRIC ENERGY PRODUCTION PLANT

(75) Inventors: Flavio Ferrera, Genoa (IT); Paolo Pesce, Genoa (IT)

(73) Assignee: Ansaldo Energia S.p.A, Genoa (IT)

( * ) Notice: Subject to any disclaimer, the term of this patent is extended or adjusted under 35 U.S.C. 154(b) by 1061 days.

(21) Appl. No.: 12/601,258

(22) Filed: Nov. 21, 2009

(65) Prior Publication Data

US 2010/0320775 A1 Dec. 23, 2010

Related U.S. Application Data

(63) Continuation of application No. PCT/EP2008/056208, filed on May 20, 2008.

(30) Foreign Application Priority Data

May 21, 2007 (EP) .................................... 07425296

(51) Int. Cl.
*F02C 9/28* (2006.01)
(52) U.S. Cl.
USPC ........................... 60/39.22; 60/773; 290/40 A
(58) Field of Classification Search
USPC ........... 290/40 A–40 E, 52; 60/773, 801, 803, 60/39.281, 39.22, 793
See application file for complete search history.

(56) References Cited

U.S. PATENT DOCUMENTS

| 6,118,187 A * | 9/2000 | Hepner et al. | 290/40 B |
| 6,792,760 B2 * | 9/2004 | Mathias et al. | 60/773 |
| 2002/0184884 A1 * | 12/2002 | McCarty | 60/773 |
| 2007/0057512 A1 * | 3/2007 | Zook | 290/40 B |

FOREIGN PATENT DOCUMENTS

| EP | 0858153 A | 8/1998 |
| WO | WO 02/33226 A | 4/2002 |

OTHER PUBLICATIONS

PCT, International Search Report for application PCT/EP2008/056208, mailed on Oct. 8, 2008.

* cited by examiner

*Primary Examiner* — Andrew Nguyen
(74) *Attorney, Agent, or Firm* — FSP LLC

(57) ABSTRACT

A control device of a gas turbine electric energy production plant (1), which delivers a power (P) at a frequency ($f_i$); the control device (8) comprising power control means (15), for controlling the power (P) delivered by the plant (1) according to a reference power value ($P_{SETNEW}$), and frequency control means (16), for determining correction values ($PF_{SETPR}$; $PF_{SETINT}$) of the reference power value ($P_{SETNEW}$) according to a frequency error ($e_F$), given by the difference between the plant frequency ($f_1$) and a nominal frequency ($f_N$); the device (8) being characterized in that the frequency control means (16) comprise integral control means (22) configured to calculate the correction values ($PF_{SETINT}$) if the frequency error (eF) is beyond a first frequency range (B1), and proportional control means (20), which are deactivated when the frequency error (eF) is beyond a first frequency range (B1).

14 Claims, 2 Drawing Sheets

CONTROL DEVICE AND METHOD OF A GAS TURBINE ELECTRIC ENERGY PRODUCTION PLANT

PRIORITY CLAIM

This application claims priority as a continuation of PCT application no. PCT/EP2008/056208 filed on May 20, 2008.

TECHNICAL FIELD

The present invention relates to a control device and method of a gas turbine electric energy production plant. Specifically, the present invention relates to a control device and method of a gas turbine electric energy production plant connected to a network working in disturbed conditions.

BACKGROUND

As it is known, gas turbine electric energy production plants normally comprise a motor assembly (turbo assembly), to which belong a variable geometry stage compressor, a combustion chamber, a gas turbine and a generator, mechanically connected to the same turbine and compressor shaft and connected to an electric distribution network through a main switch.

Turbo-gas plants are further equipped with control devices, which implement the various operations needed for an appropriate plant operation and for meeting the standard requirements related to the performances of plants in terms of safety, stability and capacity of responding to variations in the demand for power by the distribution network.

Normally, when connected to the electric network, the plant outputs an electric power at a frequency which is stably maintained by control devices about a given frequency value, named nominal frequency (50-60 Hz).

Specifically, the known control devices perform the so-called primary setting, which stabilizes the plant frequency by varying the supply of fuel to the combustion chamber according to the difference between the nominal frequency and the plant frequency. The primary setting generally implements a proportional control logic.

However, the primary setting is not always sufficient to guarantee the stability of the frequency of the delivered electric power.

The plant is usually connected to a network comprising a plurality of electric energy production plants and loads, organized in a grid structure. In ordinary conditions, all the plants connected to the network participate to the frequency setting, which is stabile and subjected only to modest fluctuations. According to the diverse operation needs, portions of the network, including one or more plants, may be selectively isolated, e.g. to prevent the propagation of possible faults.

However, major frequency variations which the primary setting cannot compensate may occur in an isolated plant, especially because the isolation of the plant intrinsically implies evident imbalances between the power delivered by the plant and the power consumed by the loads. Specifically, the known control devices are not always capable of re-establishing a condition of balance (delivered power=consumed power) and thus of reaching the nominal frequency value again.

SUMMARY

It is an object of the present invention to make a control device which is free from the drawbacks of the known art herein described; specifically, it is an object of the invention to make a control device capable of maintaining the plant power delivery frequency close to the nominal value also in unusual operating conditions, and specifically in conditions of isolation from the network.

In accordance with such objects, the present invention relates to a control device and method of a gas turbine electric energy production plant as claimed in claims 1 and 9, respectively.

BRIEF DESCRIPTION OF THE DRAWINGS

Further features and advantages of the present invention will be apparent in the following description of a non-limitative example of embodiment thereof, with reference to the figures in the accompanying drawings, in which.

DETAILED DESCRIPTION

Figure 1:
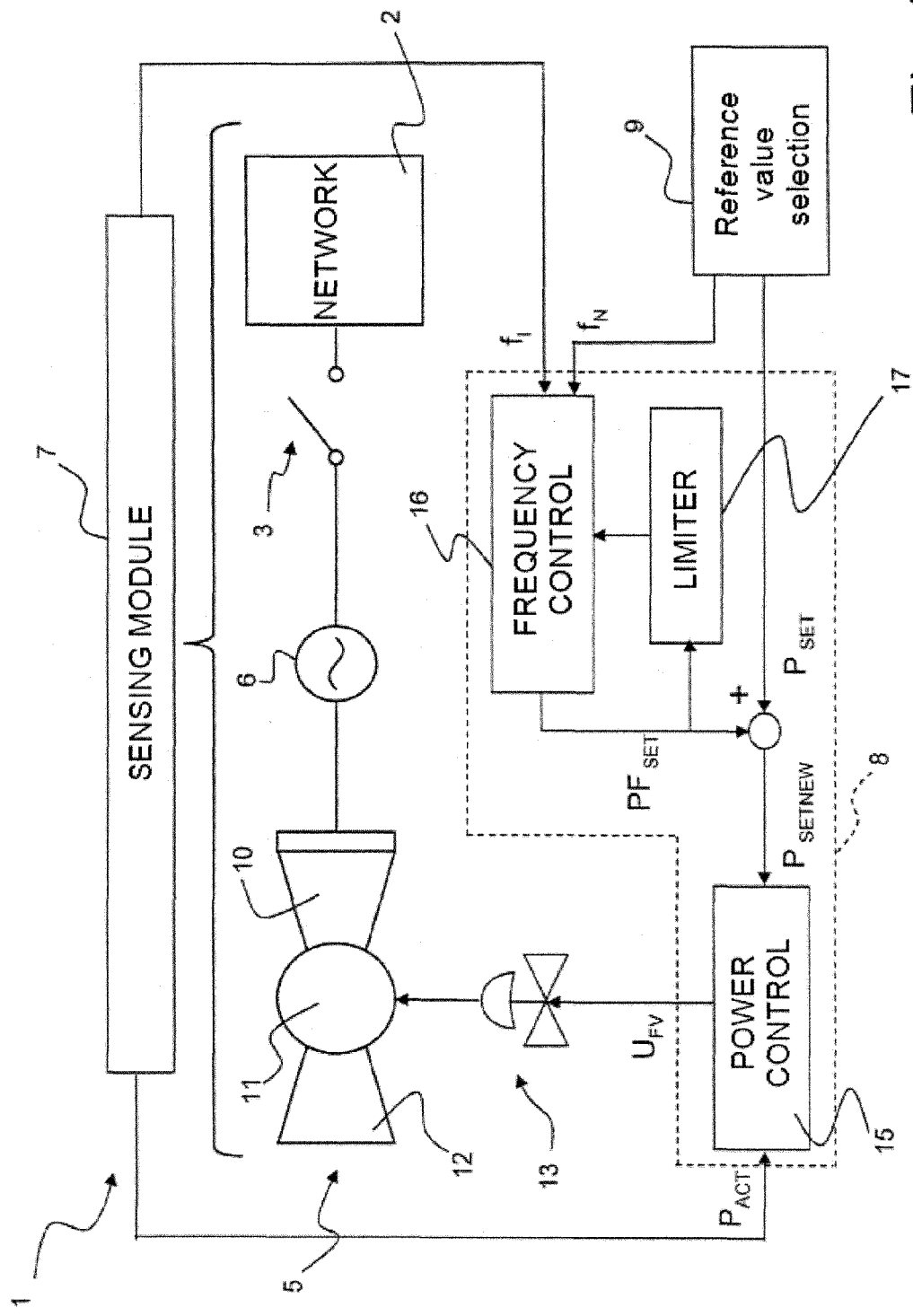
FIG. 1 is a simplified block diagram of an electric energy production plant in which a control device according to the present invention is incorporated.

FIG. 1 shows a gas turbine plant 1 for the production of electric energy. Plant 1 is selectively connectable to a distribution network 2 through a main switch 3 and comprises a turbo assembly 5, a generator 6, a detection module 7, a control device 8 and a reference value selection module 9.

Turbo assembly 5 is of the conventional type and comprises a compressor 10, a combustion chamber 11 and a gas turbine 12. Combustion chamber 11 receives the fuel through a feeding valve 13.

Generator 6 is mechanically connected to the same axis as turbine 12 and compressor 10 and is rotationally driven at the same angular rotation speed $\omega$ of turbine 12 and compressor 10. Generator 6 transforms the mechanical power supplied by turbine 12 into active electric power, hereinafter simply named delivered power P and makes it available to distribution network 2 at a frequency $f_I$.

Detection module 7 is in communication with a plurality of sensors (not shown) of plant 1 and supplies a series of parameters related to plant 1, such as plant frequency $f_I$, delivered power P, turbine exhaust gas temperature 12 etc., to control device 8.

Reference value selection module 9 generates reference signals to be supplied to control device 8. Specifically, reference value selection module 9 supplies a nominal frequency value $f_N$ (50-60 Hz) and a set power value $P_{SET}$ to control device 8. Such reference values $f_N$ and $P_{SET}$ are generally established beforehand or manually entered by an operator.

Control device 8 uses the parameters from detection module 7 and from reference value selection module 9 to generate control signals adapted to adjust the supply of fuel to combustion chamber 11 and the flow rate of air fed to compressor 10. Specifically, control device 8 generates a control signal $U_{FV}$ which is sent to valve 13 to set the supply of fuel to combustion chamber 11.

Control device 8 comprises a plurality of control modules (not shown in figure) by means of which the plant variables are controlled, such as for example angular rotation speed $\omega$, delivered power P, turbine exhaust gas temperature 12, etc. Specifically, control device 8 comprises a power control module 15, a frequency control module 16 and a limiting module 17.

Power control module 15 controls power P delivered by plant 1 according to a reference power value $P_{SETNEW}$. Specifically, power control module 15 receives as input a current delivered power value $P_{ACT}$, from detection module 7, and a reference power value $P_{SETNEW}$, given by the sum of set power value $P_{SET}$ from reference value selection module 9 and a power correction value $PF_{SET}$ from frequency control module 16, and generates control signal $U_{FV}$ for controlling fuel feeding value 13 to combustion chamber 11. Preferably, power control module 15 implements a PID (Proportional Integral Derivative) control logic based on a power error $e_p$, i.e. on the difference between current power $P_{ACT}$ and reference power value $P_{SETNEW}$ ($P_{ACT}$-$P_{SETNEW}$).

Frequency control module 16 receives as inputs nominal frequency value $f_N$ and plant frequency value $f_I$ coming from detection module 7, and generates a (positive or negative) power correction value $PF_{SET}$ which is added to set power value $P_{SET}$ to form reference power value $P_{SETNEW}$, according to a frequency error $e_F$ ($f_I$-$f_N$). In essence, frequency control module 16 provides a power correction value $PF_{SET}$ such as to minimize frequency error $e_F$, i.e. so as to maintain plant frequency $f_I$ close to nominal frequency $f_N$.

Limiting module 17 receives power correction value $PF_{SET}$ as input and is made so as to limit both power correction value $PF_{SET}$ and the excessively sudden increases of power correction value $PF_{SET}$. Specifically, when power correction value $PF_{SET}$ exceeds a certain threshold value, limiting module 17 deactivates frequency control module 16 so as to prevent correction value $PF_{SET}$ from rising and compromising the operation of plant 1, e.g. due to the reaching of the maximum flow rate limit of the gas turbine. For example, the deactivation of frequency control module 16 may be obtained by canceling the proportionality constants.

Furthermore, limiting module 17 avoids excessively sudden increases of power correction value $PF_{SET}$ by limiting the derivative of correction value $PF_{SET}$. The rising velocity of power correction value $PF_{SET}$ must indeed be lower than a threshold value to prevent damage to plant 1. In the described example, such limit is equal to 13 MW/min. If the derivative of correction value $PF_{SET}$ reaches said threshold value, power limiting module 17 deactivates frequency control module 16 so as to prevent correction value $PF_{SET}$ from rising and compromising the operation of plant 1. Also in this case, the deactivation of frequency control module 16 may be obtained for example by canceling the proportionality constants.

Figure 2:
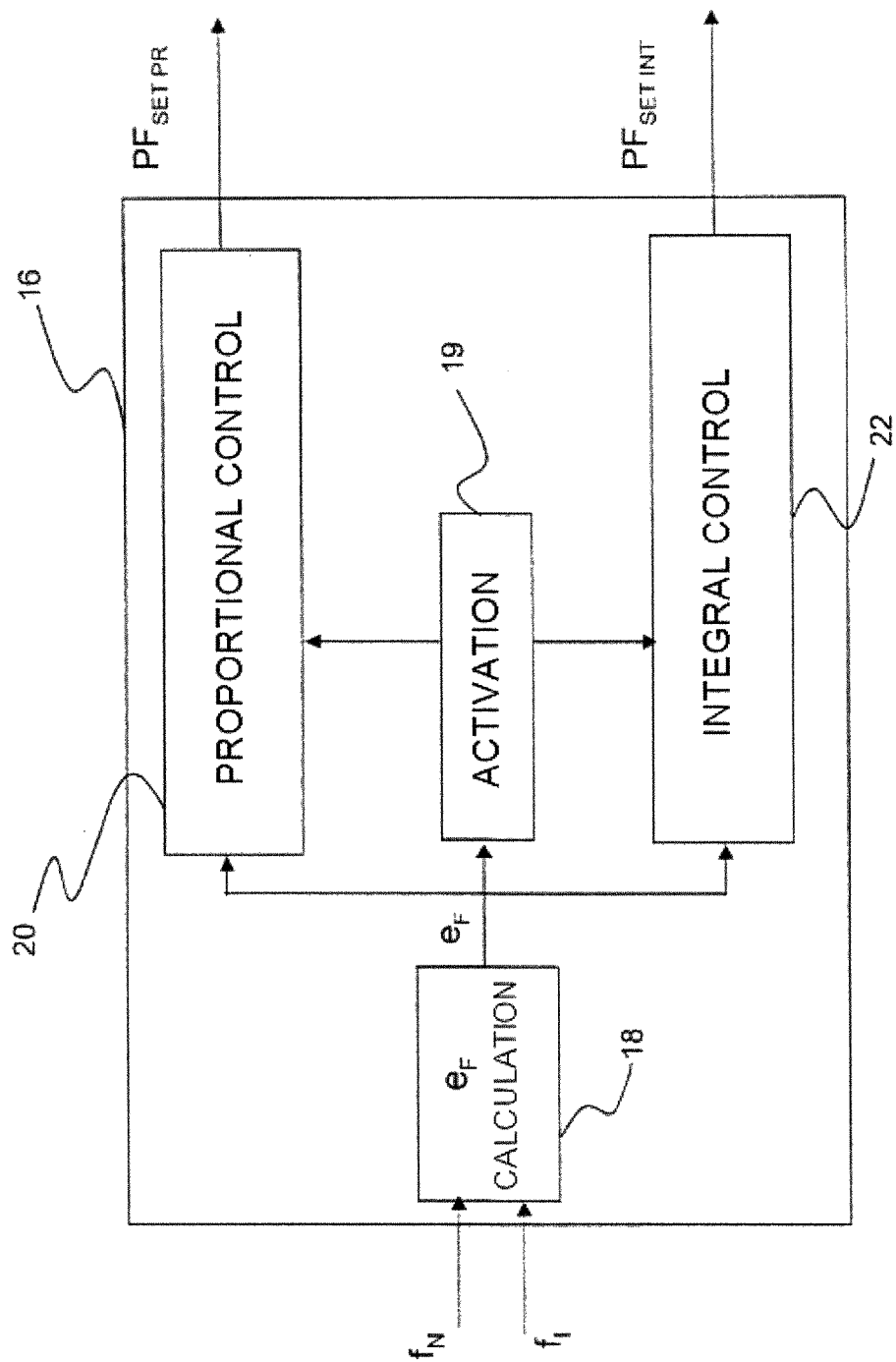
FIG. 2 is a block diagram of a detail of the control device incorporated in the plant in FIG. 1.

With reference to FIG. 2, frequency control module 16 comprises a frequency error calculation module 18, an activation module 19, a proportional control module 20, also named primary control module 20, and a step control module 22.

Frequency error calculation module 18 calculates frequency error $e_F$ as the difference between plant frequency $f_I$ and nominal frequency $f_N$ (50-60 Hz). Frequency error value $e_F$ is respectively fed to activation module 19, proportional control module 20 and to integral control module 22.

Activation module 19 evaluates the frequency error value $e_F$ and selectively sends an activation signal to proportional control module 20 or to integral control module 22.

Specifically, if frequency error $e_F$ is comprised in a first safety range B1, generally equal to approximately ±6% of the value of frequency error $e_F$, e.g. ±0.3 Hz, activation module sends an activation signal to proportional control module 20, and an activation signal to integral control module 22 if the frequency error is beyond first safety range B1 (critical condition). Once the activation signal has been sent to integral control module 22, activation module 19 cannot send any activation signal to proportional control module 20 until a deactivation of integral control module 22 occurs. The deactivation of integral control module 22 is preferably manual and performed by an operator. Alternatively, activation module 19 may perform an automatic deactivation of integral control module 22 when given conditions are satisfied, in terms of frequency error $e_F$ and of other parameters of plant 1.

The manual deactivation of integral control module 22, and the consequent restoring of the initial selective activation of proportional module 20 or of integral module 22, may only be performed if frequency error $e_F$ is within a second safety range B2, generally equal to approximately ±2% of the value of frequency error $e_F$, for example±0.1 Hz.

In practice, when frequency error $e_F$ assumes critical values, integral control module 22 intervenes and proportional control module 20 is deactivated. This configuration remains unchanged until the operator reckons that the intervention of integral control module 22 is no longer fundamental. Generally, the operator deactivates integral control module 22 when plant 1 is connected to electrical network 2 again.

Proportional control module 20 provides a power correction value $PF_{SETPR}$ by following a proportional control logic based on frequency error $e_F$, while integral control module 22 provides a power correction value $PF_{SETINT}$ following an integral control logic based on frequency error $e_F$.

In practice, frequency control module 16 provides a power correction value $PF_{SETPR}$ if frequency error $e_F$ is comprised in first safety range B1, while it provides a power correction value $PF_{SETINT}$ if frequency error $e_F$ is not comprised in first safety range B1.

The present invention presents the following advantages.

Firstly, the control device according to the present invention allows to obtain a good and effective setting of the frequency in the plant also if the plant is isolated from the network. Specifically, control device is capable of setting the frequency of the plant taking the physical and dynamic limits of the plant itself into account.

The integral setting performed by the integral control module indeed contributes to restoring the nominal frequency with a slow, integrated action with respect to the frequency error, thus completing the proportioning control action of the primary setting. In this manner, the plant improves its capacity of tackling network emergencies.

Finally, the control device according to the present invention is easily installable in plants which are already running because no structural modifications are required.

It is finally apparent that changes and variations may be made to the device and method described herein without departing from the scope of protection of the accompanying claims.

The invention claimed is:

1. A control device of a gas turbine electric energy production plant (1), which delivers a power (P) at a frequency ($f_1$); the control device (8) comprising power control means (15), for controlling the power (P) delivered by the plant (1) according to a reference power value ($P_{SETNEW}$), and frequency control means (16), for determining correction values ($PF_{SETPR}$; $PF_{SETINT}$) of the reference power value ($P_{SETNEW}$) according to a frequency error ($e_F$), given by the difference between the plant frequency ($f_1$) and a nominal frequency ($f_N$); the device (8) being characterized in that the frequency control means (16) comprise integral control means (22) configured to calculate the correction values ($PF_{SETINT}$) if the frequency error (eF) is beyond a first frequency range (B1) and proportional control means (20), which are deactivated when the frequency error (eF) is beyond the first frequency range (B1).

2. A device according to claim 1, characterized in that the integral control means (22) are de-activatable when the frequency error ($e_F$) is comprised in a second frequency range (B2) within the first frequency range (B1).

3. A device according to claim 2, characterized in that the integral control means (22) are manually deactivatable.

4. A device according to claim 1, characterized in that the proportional control means (20) are configured to calculate the correction values ($PF_{SETR}$) when the frequency error ($e_F$) is within the first frequency range (B1).

5. A device according to claim 1, further comprising a limiter (17) configured to limit the derivative of the correction values ($PF_{SETPR}$; $PF_{SETINT}$) under a first threshold value.

6. A device according to claim 5, characterized in that the limiter (17) is configured to limit the correction values ($PF_{SETPR}$; $PF_{SETINT}$) under a second threshold value.

7. A control method of a gas turbine electric energy production plant (1), which delivers a power (P) at a frequency ($f_I$); the control method comprising the steps of:
controlling the power (P) delivered by the plant according to a reference power value ($P_{SETNEW}$), and
controlling the frequency ($f_I$) of the plant (1) according to a frequency error ($e_F$), given by the difference between the plant frequency ($f_I$) and a nominal frequency ($f_N$); the step of controlling the frequency ($f_I$) comprising determining correction values ($PF_{SETPR}$; $PF_{SETINT}$) of the reference power value ($P_{SETNEW}$) according to the frequency error ($e_F$); the method being characterized in that the step of determining correction values ($PF_{SETPR}$; $PF_{SETINT}$) comprises selectively activating an integral control (22) according to the frequency error ($e_F$) when the frequency error ($e_F$) is beyond a first frequency range (B1) and deactivating a proportional control (20) according to the frequency error (eF) when the frequency error (eF) is beyond the first frequency range (B1).

8. A method according to claim 7, characterized in that the step of determining correction values ($PF_{SETPR}$; $PF_{SETINT}$) comprises selectively deactivating the integral control (22) when the frequency error ($e_F$) is comprised in a second frequency range (B2) within the first frequency range (B1).

9. A method according to claim 8, characterized in that the integral control (22) is manually deactivatable.

10. A method according to claim 7, characterized in that the step of determining correction values ($PF_{SETPR}$; $PF_{SETINT}$) comprises selectively activating a proportional control (20) according to the frequency error ($e_F$) when the frequency error ($e_F$) is within the first frequency range (B1).

11. A method according to claim 7, further comprising a step of limiting the derivative of the correction values ($PF_{SETPR}$; $PF_{SETINT}$) under a first threshold value.

12. A method according to claim 11, further comprising a step of limiting the correction value ($PF_{SETPR}$; $PF_{SETINT}$) under a second threshold value.

13. A method according to claim 11, characterized in that the step of limiting the derivative of the correction values ($PF_{SETPR}$; $PF_{SETINT}$) under a first threshold value comprises stopping the step of determining correction values (PFSETPR; PFSETINT).

14. A method according to claim 12, characterized in that the step of limiting the correction value (PFSETPR; PFSETINT) under a second threshold value comprises stopping the step of determining correction values (PFSETPR; PFSETINT).

* * * * *